United States Patent
Miya et al.

[11] Patent Number: 6,095,719
[45] Date of Patent: Aug. 1, 2000

[54] PROCESS FOR CONSTRUCTING INTAKE PIPE

[75] Inventors: Kiyoshi Miya; Yoshihiro Tanaka, both of Tokyo, Japan

[73] Assignee: Obayashi Corporation, Osaka, Japan

[21] Appl. No.: 09/147,622

[22] PCT Filed: Aug. 6, 1998

[86] PCT No.: PCT/JP98/03503

§ 371 Date: Feb. 3, 1999

§ 102(e) Date: Feb. 3, 1999

[87] PCT Pub. No.: WO99/09297

PCT Pub. Date: Feb. 25, 1999

[30] Foreign Application Priority Data

Aug. 13, 1997 [JP] Japan .................................... 9-218492

[51] Int. Cl.[7] .................................................. E01F 5/00
[52] U.S. Cl. ............................ 405/127; 405/52; 405/80; 405/151
[58] Field of Search ..................... 405/127, 146, 405/151, 52, 132, 134–137, 80, 87

[56] References Cited

U.S. PATENT DOCUMENTS

| | | | |
|---|---|---|---|
| 1,315,615 | 9/1919 | Wahlman | 405/127 |
| 2,361,231 | 10/1944 | Nebolsine | 405/127 X |
| 4,167,357 | 9/1979 | Assad | 405/52 X |
| 5,052,855 | 10/1991 | Chapman et al. | 405/127 X |
| 5,228,518 | 7/1993 | Wilson et al. | 166/376 X |
| 5,256,310 | 10/1993 | Brooks | 405/127 X |

FOREIGN PATENT DOCUMENTS

| | | |
|---|---|---|
| 5-156900 | 6/1993 | Japan . |
| 7-43656 | 9/1995 | Japan . |

*Primary Examiner*—Dennis L. Taylor
*Attorney, Agent, or Firm*—Nixon Peabody LLP; Thomas W. Cole

[57] ABSTRACT

With a method for constructing a water intake pipe, a vertical shaft 10 is constructed, and a shield tunnel 12 is constructed by causing a shield driving machine to advance from the vertical shaft 10 toward a seashore by breaking the wall of the vertical shaft 10. The tunnel 12 becomes a water intake pipe after the tunnel is constructed, and is built by annularly assembling segments 14 one after another at the rear side of the shield driving machine in line with the advancement thereof. Two types of segments 14, RC segments 18 and ductile segments 20, are used. The segments 20 are provided with water intake pores clogged by clogging members. After the tunnel 12 is constructed, workmen enter the shield tunnel 12 with compressed air supplied thereto, and remove the clogging members of the ductile segments 20. After the clogging members are removed, sea water is gradually taken into the tunnel 12 through the water intake pores 20c while lowering the compressed air pressure so that sea water does not rush into the tunnel 12.

10 Claims, 5 Drawing Sheets

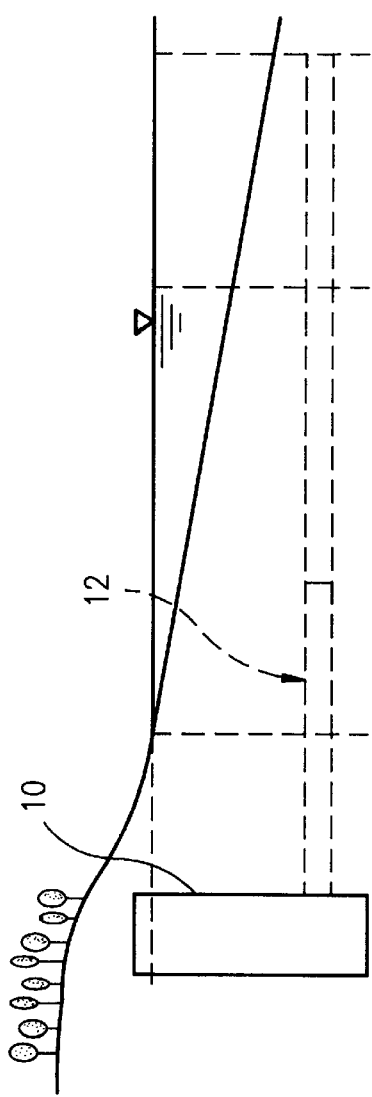
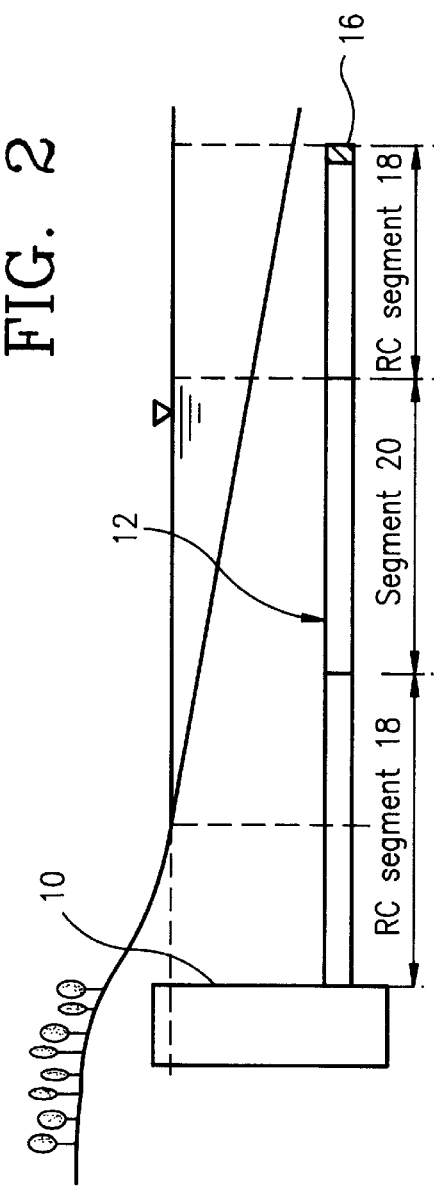

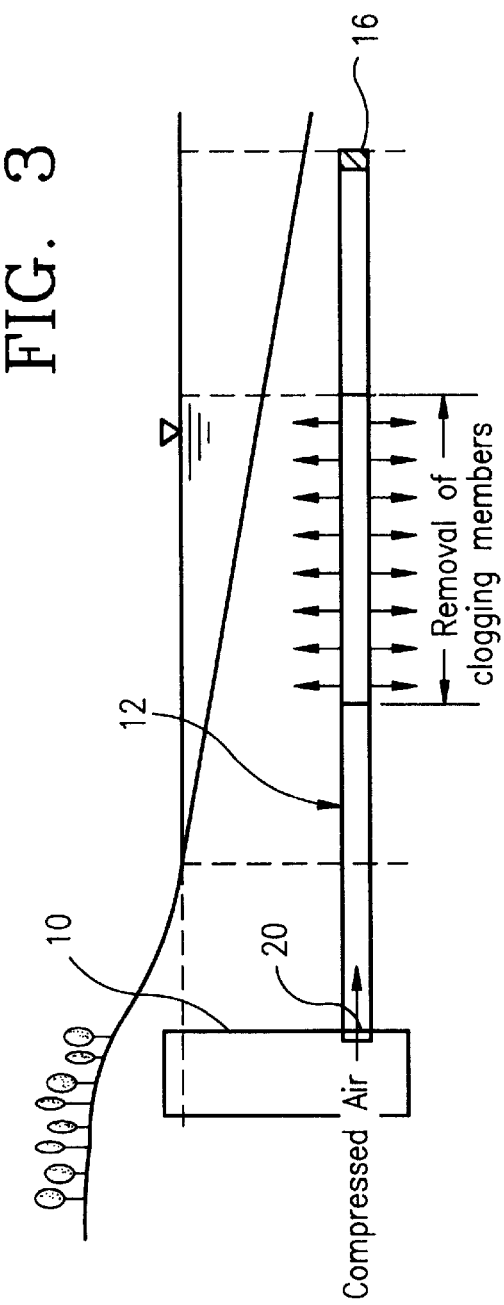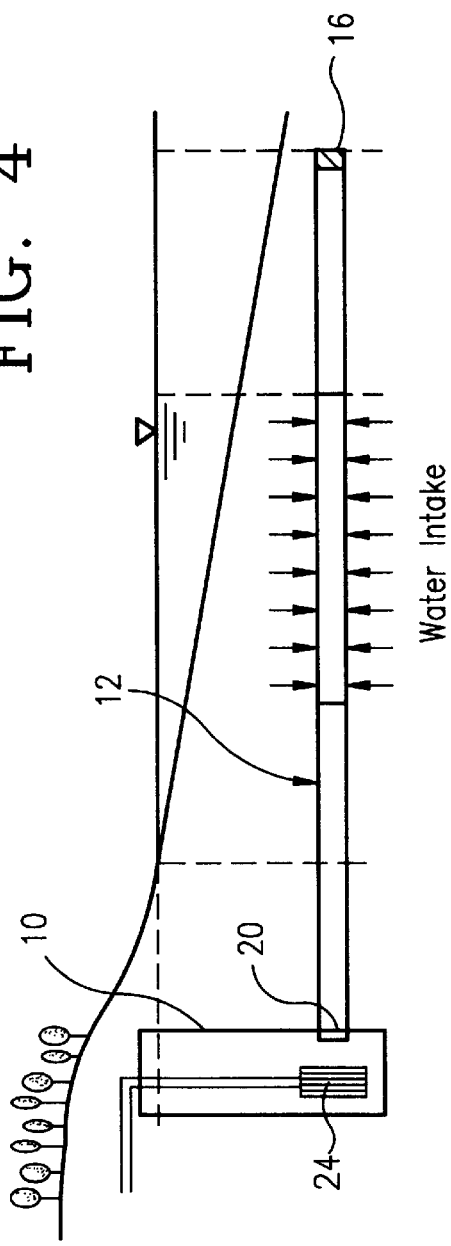

PROCESS FOR CONSTRUCTING INTAKE PIPE

TECHNICAL FILED

The present invention relates to a method for constructing a water intake pipe, and in particular a method for constructing a water intake pipe which is used to introduce a great amount of sea water into a sea water treatment plant such as a plant for turning sea water into fresh water, and a power generation plant such as a nuclear power generation plant.

BACKGROUND OF THE ART

A plant for turning sea water into fresh water was constructed in the vicinity of a seashore in order to obtain drinking water on an island and a desert region where there is only a small amount of precipitation. Furthermore, sea water is, for example, prime water for a plant making salt. In this type of sea water treatment plant, it is necessary to introduce a great amount of sea water into equipment for turning sea water into fresh water.

Furthermore, in a nuclear power generation plant, a great amount of cooling water is required. Therefore, in this type of power generation plant constructed in a place adjacent to a seashore, a great amount of sea water is required.

Therefore, conventionally, in such a sea water treatment plant and a power generation plant, sea water was taken in by a water intake structure shown in FIG. 7.

In the water intake structure illustrated in the same drawing, a water reservoir 1 is installed in the vicinity of a seashore, a water collecting portion 2 is installed on the sea bottom, and a water conveyance pipe 3 is used to connect the water reservoir 1 to the water collecting portion 2, wherein sea water taken into the water reservoir 1 is pumped up by a pump 4 and is distributed to various kinds of facilities.

A number of water intake pipes 4 protruding toward both sides of the water conveyance pipe 3 are provided at the water collecting portion 2. A number of through holes are provided on the respective water intake pipes 4, and a synthetic resin net or unwoven cloth is wound on the outer circumference thereof in order to prevent earth and sand from invading.

In such a water intake structure, usually, a water conveyance pipe 3 is buried by a driving method or a dig-sink method.

However, in such a conventional burying method of a water conveyance pipe 3, there existed the following shortcomings and problems in the technical aspects as described below.

That is, when burying a water conveyance pipe 3 by a driving method or a dig-sink method, many limitations in working exist, resulting from the surrounding vicinity of the place directly above the burying position of the water conveyance pipe 3 being exclusively occupied.

For example, in work carried out by the driving method in the sea, since sea water is to be shut out, it becomes necessary to guarantee fishery rights, and causes a hindrance in sea transportation.

Furthermore, when driving into the sea bottom, there is a fear that the sea will be polluted.

The invention was developed in view of such shortcomings and problems inherent to the conventional art, and it is therefore an object of the invention to provide a method for constructing a water intake pipe, which is able to construct a water intake pipe without exclusively occupying the surrounding directly above the work site during the construction.

Furthermore, it is another object of the invention to provide a method for constructing a water intake pipe, which does not adversely influence the surrounding environments of the work site during the construction.

DISCLOSURE OF THE INVENTION

In the invention, in a method for constructing a water intake pipe which introduces sea water to a sea water treatment plant such as a plant for turning sea water into fresh water and a power generation plant, a vertical shaft which becomes a water reservoir after the construction is completed, is constructed in the vicinity of a seashore, and a shield tunnel for a water intake pipe is constructed from the vertical shaft to the seashore, and after the abovementioned shield tunnel is constructed, water intake pores for intake of sea water, which are provided at segments of the abovementioned shield tunnel, are caused to communicate with the outside.

According to the method for constructing a water intake pipe, which is thus constructed, the shield tunnel which becomes a water intake pipe, can be constructed from the vertical shaft without exclusively occupying the places directly above the tunnel.

It is possible to radially form a plurality of the abovementioned shield tunnels from the abovementioned vertical shaft to a seashore.

The construction is preferable in a case where a great amount of sea water is taken in.

The abovementioned shield tunnel may be formed so that after it is once formed from the abovementioned vertical shaft to a seashore, it returns to the abovementioned vertical shaft after making a U-turn on the sea bottom.

According to the construction, a shield driving machine which is used to form a shield tunnel can be easily collected and re-used.

The abovementioned water intake pores are provided in advance on the abovementioned segments and are closed with clogging members during the construction of the abovementioned shield tunnel. After the corresponding shield tunnel is constructed, the abovementioned clogging members are removed so that the water intake pores are caused to have a sea water intake feature.

According to the construction, it is possible to smoothly form a shield tunnel without any hindrance.

The clogging members can be removed by introducing compressed air into the abovementioned shield tunnel while preventing sea water from invading. Furthermore, the clogging members can be removed by introducing sea water or fresh water into the shield tunnel.

The abovementioned segments consist of ductile segments which are able to take in sea water through porous concrete portions by removing the abovementioned clogging members, and the ductile segments may be used over the entire length of the shield tunnel.

The segments may be composed of RC segments made of steel reinforced concrete having almost no water permeability and ductile segments which are able to take in sea water through porous concrete portions by removing the abovementioned clogging members.

The RC segments may be provided at the vertical shaft side and the tip end side of the abovementioned shield tunnel.

After the abovementioned RC segments are cylindrically assembled, they may be constructed so that a covering and lining layer and a rust-preventive lining layer are formed on their interior side.

BRIEF DESCRIPTION OF THE DRAWINGS

FIG. 1 is an explanatory view of the process which is first carried out in a method for constructing a water intake pipe according to the invention, FIG. 2 is an explanatory view of the process which is performed just after the first process in FIG. 1, FIG. 3 is an explanatory view of a process which is performed after the process shown in FIG. 2, FIG. 4 is an explanatory view of a process which is performed after the process shown in FIG. 3.

BEST MODE FOR CARRYING OUT THE INVENTION

Figure 5A:
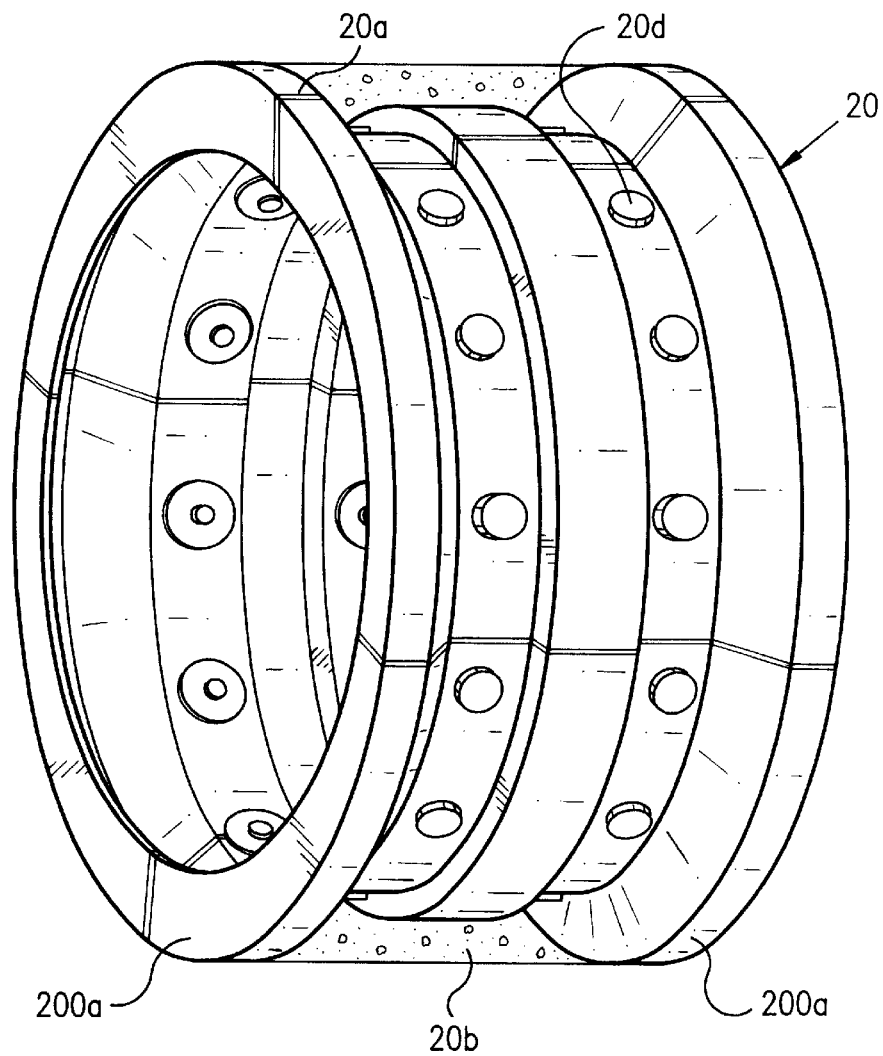
FIG. 5A is a perspective view showing, in an assembled state, one example of segments used for a method for constructing a water intake pipe according to the invention.

Hereinafter, a detailed description is given of preferred embodiments of the invention with reference to the accompanying drawings. FIG. 1 through FIG. 4 show one preferred embodiment of a method for constructing a water intake pipe according to the invention.

With the constructing method illustrated in these drawings, first, as shown in FIG. 1, a vertical shaft 10 is constructed under the ground in the vicinity of a seashore where a sea water treatment plant (not illustrated) such as a plant for turning sea water into fresh water exists.

The vertical shaft 10 is constructed to an appointed depth, with its lower end closed, by using various types of soil-stopping wall method and caisson method, which are already known. After the construction, the vertical shaft 10 is used as a reservoir of taken-in sea water.

After the vertical shaft 10 is constructed, a shield driving machine (not illustrated) is installed on the bottom and is advanced toward the seashore, breaking the wall of the vertical shaft 10, wherein a shield tunnel 12 is shown by dashed lines in FIG. 1 is constructed.

The shield tunnel 12 becomes a water intake pipe after the construction is completed, and is constructed by cylindrically assembling segments one after another at the rear side of the shield driving machine in line with the driving of the shield driving machine as in construction of an ordinary shield tunnel.

The shield tunnel 12 according to the preferred embodiment is caused to linearly extend from the vertical shaft 10 toward a seashore, and the tip end thereof reaches an appointed depth below the sea bottom and is positioned below the sea bottom.

Furthermore, not only may the single shield tunnel 12 may be provided from the vertical shaft 10 toward the seashore side, but also a plurality of shield tunnels may be radially provided from the vertical shaft 10 toward the seashore side.

After the construction such a shield tunnel 12 is completed, the shield driving machine is left over at the tip end position of the shield tunnel 12 as it is, and a tip end bulkhead 16 is secured at the tip end of the shield tunnel 12.

Furthermore, as segments of the shield tunnel 12 of the preferred embodiment, two types of segments are used, one of which is steel-reinforced concrete type RC segments 18 having almost no water permeability, and the other of which is cast iron type ductile segments 20.

The RC segments 18 are used at the vertical shaft 10 side and the tip end side of the shield tunnel 12, and the ductile segments 20 are used between these portions.

The RC segments 18 are those used in an ordinary shield construction method, and are such that a cylindrical body having an appointed length is circumferentially divided into a plurality of sections, these sections adjacent to each other in the circumferential and lengthwise directions are connected to each other by bolts to be assembled so that they are cylindrical, and after a secondary covering concrete layer is formed on the inner circumferential surface of the assembled segments 18, for example, an epoxy resin lining layer is formed to prevent corrosion on the further inner circumferential surface thereof.

Figure 5B:
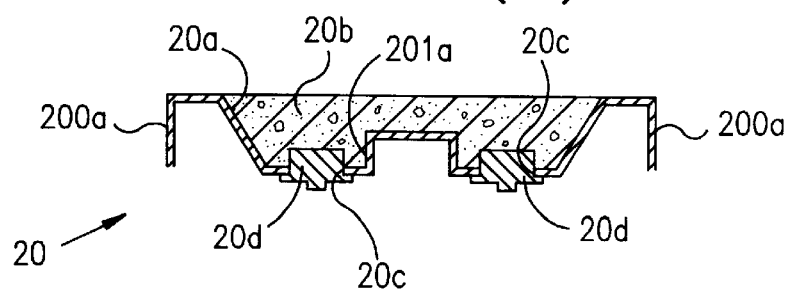
FIG. 5B is a cross-sectional side view of the intake pipe shown in FIG. 5A.

One example of the ductile segments 20 employed for a shield tunnel 12 according to the invention is illustrated in FIG. 5. The ductile segments 20 illustrated in the same drawing are those in which a cylindrical body having an appointed length is cylindrically divided into a plurality of sections as in the RC segments 18, and are such that the sections adjacent to each other in the circumferential and lengthwise directions are connected to each other, and they are assembled to be annular.

A ductile segment 20 is provided with a segment body 20a, porous concrete portion 20b, water intake pores 20c, and clogging member 20d. The segment body 20a is constructed of cast iron plate or steel plate and is provided with a pair of connection flanges 200a at both ends in the lengthwise direction, wherein two recessed portions 201a concave inwardly are formed on the outer circumferential surface between the flanges 200a.

The porous concrete portion 20b is a porous body having water permeability and is poured and solidified in the recessed portion 201a. The water intake pores 20c are formed and caused to penetrate the flat bottoms of two continuous recessed portions 201a.

The clogging members 20d are detachably screwed onto the water intake pores 20c, whereby the clogging members 20d clog the water intake pores 20c, and if the clogging members 20d are removed, the water intake pores 20c are caused to communicate with the outside via the porous concrete portions 20b, thereby enabling water intake of sea water.

Since, at the ductile segments 20 illustrated in FIG. 5, porous concrete portions 20b are provided on the entire circumferential surface, it is possible to collect sea water from the entirety of the portions, wherein the water collection amount is further increased by increasing the water collection range, and at the same time the velocity toward the water intake pores 20c is made slower at the surface side, wherein it is advantageous in that clogging scarcely occurs.

After the construction of the shield tunnel 12 is completed, as shown in FIG. 3, a bulkhead 20 is installed at the beginning side of the shield tunnel 12, and compressed air is supplied into the shield tunnel 12, workmen enter the shield tunnel 12 and remove the clogging members 20d of the ductile segments 20.

In this case, since compressed air is provided in the shield tunnel 12, sea water is prevented from flowing into the tunnel through water intake pores 20c even though the clogging members 20d are removed, and since the compressed air introduced into the tunnel 12 leaks out while passing through the water intake pores 20c and porous concrete portions 20b, it is possible to prevent these portions from being clogged.

As all the clogging members 20d of the ductile segments 20 are removed, the compressed air pressure is gradually lowered so that sea water does not rush into the shield tunnel 12, wherein sea water is gradually taken into the tunnel 12 through the water intake pores 20c.

At the same time, sea water is taken into the vertical shaft 10 which will become a sea water reservoir. After the water level in the vertical shaft 10 becomes identical to the sea level, the bulkhead 20 at the starting side of the tunnel 12 is opened (See FIG. 4).

After such operations are completed, the construction of a water intake pipe composed of a shield tunnel is finished, a pump 24 is installed in the vertical shaft 10, wherein it is possible to send sea water to a treatment facility side.

Thus, according to the method for constructing a water intake pipe, a shield tunnel 12 which becomes a water intake pipe can be constructed from the vertical shaft 10 without exclusively occupying a place directly above the shield tunnel. Therefore, no problem occurs with respect to a hindrance in sea transportation, fishery rights, and ocean pollution, etc.

In the preferred embodiment, water intake pores 20c are provided in advance in the segments 20 and are clogged by clogging members 20d during the construction of a shield tunnel 12. After the corresponding shield tunnel 12 is completed, the clogging members 20d are removed to cause the shield tunnel 12 to communicate with the outside, wherein a sea water intake function is given to the water intake pores 20c. Therefore, it is possible to smoothly construct the shield tunnel 12 without any obstacle.

Furthermore, with the preferred embodiment, since porous concrete portions 20b are provided on the upper parts of the water intake pores 20c, the porous concrete portions 20b functions as a filter, and it is possible to prevent foreign substances such as sand and other matter from invading.

Furthermore, the clogging members 20d are removed while preventing sea water from invading by supplying compressed air into the shield tunnel 12, and the introduced compressed air leaks out to prevent the water intake pores 20c and porous concrete portions 20b from being clogged.

Still furthermore, introduction of compressed air when removing the clogging members 20c described in the abovementioned preferred embodiment is not limited to this method. For example, the clogging members can be removed by diving operations with the water level in the vertical shaft 10 kept identical to the sea level by introducing sea water into the shield tunnel.

Furthermore, in the preferred embodiment, the entire shield tunnel 12 is composed of ductile segments 20 constructed above, and clogging members 20c are removed at only the necessary sections, wherein a part of the shield tunnel 12 can be given a water intake function.

Figure 6:
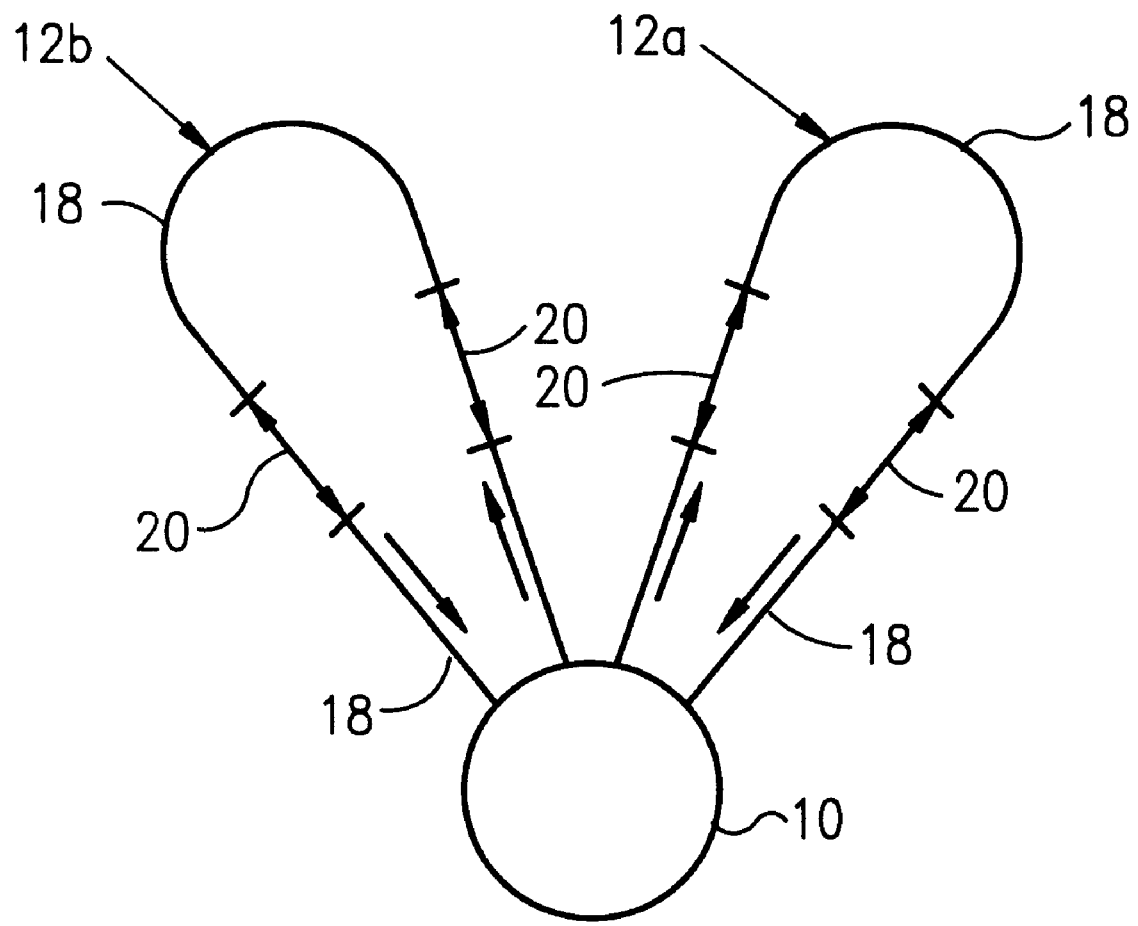
FIG. 6 is an explanatory view showing another preferred embodiment of a method for constructing a water intake pipe according to the invention.
Figure 7A:
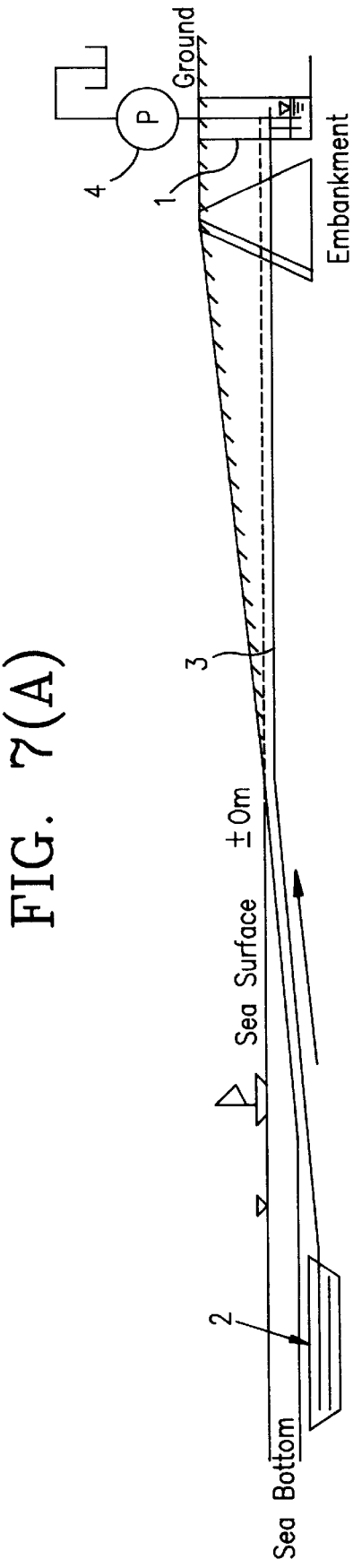
FIGS. 7A–B are explanatory views showing examples of conventional water intake structure.
Figure 7B:
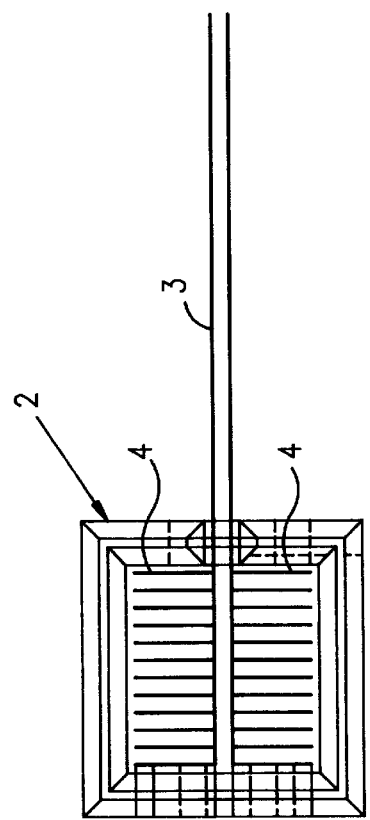

FIG. 6 shows another preferred embodiment of the invention, wherein parts which are equivalent to or identical to those in the abovementioned preferred embodiment are given the same reference numbers, and the description thereof is omitted. Only the features thereof are described below.

In the preferred embodiment shown in FIG. 6, a shield tunnel which becomes a water intake pipe is composed of a first shield tunnel 12a and a second shield tunnel 12b. After the respective shield tunnels 12a and 12b are formed from the vertical shaft 10 toward the seashore, they are formed so that they make a U-turn below the sea bottom and return to the vertical shaft 10 again.

When constructing such shield tunnels 12a and 12b, the first shield tunnel 12a is formed, and a shield driving machine which has returned to the vertical shaft 10 is subjected to a change of direction in the vertical shaft 10. Subsequently, the shield driving machine is re-started to form the second shield tunnel 12b, wherein the shield driving machine which has returned is removed from the vertical shaft 10.

The shield tunnels 12a and 12b are provided with ductile segments 20 at appointed sections thereof, and clogging members 20d are removed after the tunnels 12a and 12b are constructed, as in the abovementioned preferred embodiment, and the water intake pores 20c are opened and are given a sea water intake function.

Furthermore, RC segments 18 illustrated in FIG. 6 may be used in only the vicinity of the vertical shaft 10, and sections other than the vicinity thereof may be constructed of ductile segments 20.

According to the method for constructing a water intake pipe thus constructed, it is possible to construct a plurality of water intake pipes by using a single shield driving machine in addition to the actions and effects of the abovementioned preferred embodiment, and simultaneously, it will become possible to collect and re-utilize a shield driving machine which forms the shield tunnels 12a and 12b.

If the constructing method according to the invention is adapted into practice, for example, the treated remaining water containing high salt concentration and warmed remaining water utilized for power generation may be discharged and drained to the sea side through a shield tunnel.

INDUSTRIAL APPLICABILITY

As described above, a method for constructing a water intake pipe according to the invention is very effective in the construction of water intake pipes for introducing a great amount of sea water into a sea water treatment facility such as a plant for turning sea water into fresh water and/or a power generation plant such as a nuclear power generation plant.

What is claimed is:

1. A method for constructing a water intake pipe for introducing seawater into a seawater treatment facility, comprising the steps of:

constructing a vertical shaft underground, which becomes a reservoir, in land near a seashore;

constructing a shield tunnel having intake pores for a water intake pipe from pipe segments from the vertical shaft toward the seashore side wherein all construction is conducted underground and under a portion of sea bottom that is porous to seawater such that the entire, completed shield tunnel is underground and under said sea bottom; and opening said seawater intake pores provided in said segments of said shield tunnel after said shield tunnel is constructed to allow seawater to flow through said shield tunnel and into said shaft.

2. A method for constructing a water intake pipe as set forth in claim 1, further comprising the step of radially constructing a plurality of shield tunnels from said vertical shaft toward the seashore side.

3. A method for constructing a water intake pipe as set forth in claim 1, further comprising the step of constructing said shield tunnel so that, after it is formed to an appointed length from said vertical shaft toward the seashore, said shield tunnel makes a U-turn below the sea bottom and returns to said vertical shaft.

4. A method for constructing a water intake pipe as set forth in claim 1, further comprising the step of forming said water intake pores in said segments before said construction of said shield tunnel and using clogging members to clog said pores during the construction of said shield tunnel, wherein said pores function to conduct seawater upon removal of said clogging members after said shield tunnel is constructed.

5. A method for constructing a water intake pipe as set forth in claim 4, further comprising the step of introducing compressed air into said shield tunnel before said clogging members are removed to prevent sea water from entering said shield tunnel until after all clogging members are removed.

6. A method for constructing a water intake pipe as set forth in claim 4, further comprising the step of removing said clogging members with sea water or fresh water introduced in said shield tunnel.

7. A method of constructing a water intake pipe as set forth in claim 4, further comprising the step of providing said segments with ductile material which is able to take in seawater through porous concrete sections upon removal of said clogging members, and the ductile material is used over the entire length of said shield tunnel.

8. A method for constructing a water intake pipe as set forth in claim 4, further comprising the step of providing said segments with steel-reinforced concrete made from RC segments having almost no water permeability, and ductile material which is able to take in seawater through porous concrete sections when said clogging members are removed.

9. A method for constructing a water intake pipe as set forth in claim 8, further comprising the step of using said RC segments at the vertical shaft side and a tip end side of said shield tunnel.

10. A method for constructing a water intake pipe as set forth in claim 9, further comprising the step of providing said RC segments with a cylindrical shape, and a covering concrete layer and a corrosion-preventing lining layer on an inner circumferential side thereof.

* * * * *